United States Patent
Eigen et al.

(10) Patent No.: US 9,957,404 B2
(45) Date of Patent: May 1, 2018

(54) LOW ODOR POLYMER LATEX AND COATING COMPOSITION COMPRISING THE SAME

(71) Applicant: Synthomer Deutschland GmbH, Marl (DE)

(72) Inventors: Claudia Eigen, Dorsten (DE); Martina Pieper, Raesfeld (DE); Bertholt Schostak, Dorsten (DE); Uwe Schulze, Dusseldorf (DE); Gareth Simpson, Cambridge (GB); Michael Voss, Erkrath (DE)

(73) Assignee: Synthomer Deutschland GmbH, Marl (DE)

(*) Notice: Subject to any disclaimer, the term of this patent is extended or adjusted under 35 U.S.C. 154(b) by 120 days.

(21) Appl. No.: 14/897,199

(22) PCT Filed: Jun. 17, 2013

(86) PCT No.: PCT/EP2013/062542
§ 371 (c)(1),
(2) Date: Dec. 9, 2015

(87) PCT Pub. No.: WO2014/202116
PCT Pub. Date: Dec. 24, 2014

(65) Prior Publication Data
US 2016/0122569 A1    May 5, 2016

(51) Int. Cl.
  B32B 27/08    (2006.01)
  C09D 109/08   (2006.01)
  C08F 36/06    (2006.01)
  C09D 103/02   (2006.01)
  C09D 109/00   (2006.01)
  C08L 3/02     (2006.01)
  C08L 9/10     (2006.01)
  C09J 103/02   (2006.01)
  D21H 19/34    (2006.01)

(52) U.S. Cl.
  CPC .......... *C09D 109/08* (2013.01); *C08F 36/06* (2013.01); *C08L 3/02* (2013.01); *C08L 9/10* (2013.01); *C09D 103/02* (2013.01); *C09D 109/00* (2013.01); *C09J 103/02* (2013.01); *D21H 19/34* (2013.01)

(58) Field of Classification Search
  CPC .................................................... C09D 109/08
  USPC ......................................................... 428/511
  See application file for complete search history.

(56) References Cited

U.S. PATENT DOCUMENTS

| | | | |
|---|---|---|---|
| 5,358,998 A | 10/1994 | Wendel | |
| 6,080,813 A * | 6/2000 | Wendel | C04B 24/26 524/52 |
| 2004/0010079 A1 | 1/2004 | Schulze | |
| 2011/0086567 A1 | 4/2011 | Christopher et al. | |
| 2011/0305916 A1 | 12/2011 | Schmidt-Thummes et al. | |
| 2013/0005870 A1 * | 1/2013 | Kelly | C08L 3/02 524/48 |

FOREIGN PATENT DOCUMENTS

| | | |
|---|---|---|
| DE | 19 540 997 | 5/1997 |
| EP | 0 536 597 A1 | 4/1993 |
| EP | 2 540 773 | 1/2013 |
| RU | 2 435 788 C2 | 12/2011 |
| RU | 2011 113 532 A | 10/2012 |
| WO | WO 2008/017406 A1 | 2/2008 |
| WO | WO 2009/123637 | 10/2009 |
| WO | WO 2011/146367 | 11/2011 |
| WO | WO 2011/157679 A1 | 12/2011 |

OTHER PUBLICATIONS

Office Action received in Colombian Application No. 15281090 corresponding to PCT/EP2013/062542.

* cited by examiner

*Primary Examiner* — Hui Chin
(74) *Attorney, Agent, or Firm* — Knobbe, Martens, Olson & Bear, LLP

(57) ABSTRACT

A reaction product is obtained by free-radical emulsion polymerization in an aqueous medium of ethylenically unsaturated monomers including at least one conjugated diene. The free-radical emulsion polymerization is conducted in the presence of a degraded polysaccharide having a DE of 38 to 70 measured according to ISO 5377 (1981 Feb. 15) and optionally an alkyl mercaptan in an amount of no more than 2.5 weight percent based on the total weight of ethylenically unsaturated monomers. A coating composition includes the reaction product, and a paper or a board can be coated with such a coating composition.

15 Claims, No Drawings

LOW ODOR POLYMER LATEX AND COATING COMPOSITION COMPRISING THE SAME

INCORPORATION BY REFERENCE TO ANY PRIORITY APPLICATIONS

This application is the U.S. National Phase of International Application No. PCT/EP2013/062542, filed Jun. 17, 2013, designating the U.S. and published in English as WO 2014/202116 on Dec. 24, 2014. Any and all applications for which a foreign or domestic priority claim is identified here or in the Application Data Sheet as filed with the present application are hereby incorporated by reference under 37 CFR 1.57.

FIELD OF THE INVENTION

The present invention relates to a polymer latex and a coating composition comprising the same that is particularly useful for coating paper and board. Furthermore, the present invention relates to paper or board coated with the inventive coating composition.

BACKGROUND

Polymer latices particularly useful in coating composition, especially for coating of paper and board have to fulfill certain performance requirements. In order to adjust the performance properties of coating compositions comprising latices it is required to adjust the molecular weight and/or degree of crosslinking of the latex polymer by using chain transfer agents as regulator. One group of polymer latices used for paper coating applications in the prior art are obtained by emulsion polymerization of ethylenically unsaturated monomers comprising conjugated dienes, particularly 1,3-butadiene. Particularly for this type of polymer latices, due to the presence of a second ethylenically unsaturated group, crosslinking and molecular weight of the resultant latex polymer has to be carefully controlled in order to obtain the desired performance properties of the coating compositions.

The most well known group of chain transfer agents that are used as regulators to control molecular weight and degree of crosslinking of the polymer latices are sulfur-containing compounds, particularly mercaptans. The most prominent and very effective regulator used according to this concept is tertiary-dodecylmercaptan. The principle disadvantage of using sulfur-containing compounds, particularly mercaptan, in the emulsion polymerization of a polymer latex as chain transfer agent is the unpleasant odor of mercaptan compounds. It might already create labour safety issues during industrial production of the polymer latices. In particular in the area of packaging papers and packaging boards that are used for odor-sensitive applications sulfur-containing chain transfer agents should be avoided. Thus, in the past there have been efforts in the industry to substitute sulfur-containing chain transfer agents by other compounds that produce less odor, particularly for the preparation of polymer latices for paper coating applications.

One approach is disclosed in US 2004/0010079 wherein in the preparation of polymer latices the emulsion polymerization is conducted in presence of peroxo compounds as chain transfer agent. However, this approach has some disadvantages in that these compounds are rather expensive and the polymerization process has to be carefully controlled to avoid that the peroxo compounds used as chain transfer agent function as free radical initiators.

Another approach is known from WO 2008/017406 wherein a polymer latex with reduced odor is obtained by emulsion polymerization in presence of a chain transfer agent comprising a mercaptan having a linear alkyl group with 3 to 20 carbon atoms. Although it was found that by substituting the commonly used tert-dodecyl mercaptan by n-dodecyl mercaptan, the odor can be considerably reduced. Nevertheless, mercaptans are present in the obtained polymer latex.

But mercaptans have been proven to be very effective chain transfer agents to adjust crosslinking and molecular weight of polymer latices in order to obtain the desired properties. Thus, mercaptans are still commonly used in the industry as chain transfer agents.

As a consequence, there is still a need in the industry for polymer latices wherein the molecular weight can be appropriately adjusted for the desired end use whereby the addition of chain transfer agents and particularly mercaptan compounds can be reduced or totally avoided without compromising the desired product properties of the resultant polymer latex, particularly when used as binder in coating compositions for paper applications.

Furthermore, it is known from the prior art to use degraded starch in emulsion polymerization of ethylenically unsaturated monomers.

EP-A 536 597 discloses emulsion polymerization of ethylenically unsaturated monomers in presence of a degraded starch having a dextrose equivalent DE of 5 to 40. In the sole example in that patent application using butadiene, the commonly applied chain transfer agent tert-dodecyl mercaptan is employed in an amount of 3 wt.-%, based on the total amount of monomers. Furthermore, this explicit example uses a degraded starch having a DE of 17 to 19. There is no recognition within the entire disclosure of EP-A 536 597 that the presence of degraded starch and the specific selection of the DE of the degraded starch may have an influence on molecular weight control of the polymer latex in emulsion polymerization.

Furthermore, it is known from WO 2011/157679 to employ degraded starches in emulsion polymerization of ethylenically unsaturated monomers comprising vinyl-aromatic compounds and $C_1$-$C_{10}$-alkyl(meth)acrylates. But this reference neither discloses any effect of degraded starches on adjusting the molecular weight of the latex polymer nor that commonly used chain transfer agents can be reduced or avoided. On the contrary, this reference explicitly teaches to use sulfur-containing chain transfer agents in amounts of up to 5 wt.-%, based on the total weight of monomers.

In WO 2009/123637, degraded starches having a dextrose equivalent DE of 10 to 35 are disclosed as to have a synergistic effect if a latex polymerized in presence of these starches is used as binder in paper coating compositions comprising tetra-sulfonate-based fluorescence whitening agents. Again, there is no hint in this reference that by using degraded starches chain transfer agents can be reduced or avoided without compromising the properties of the resultant polymer latex.

U.S. Pat. No. 5,026,746 and U.S. patent application US 2011/0086567 disclose the use of starch-based binder prepared in presence of a degraded starch having a low DE equivalent of 1 to 20.

Thus, it is the object of the present invention to provide a low odor polymer latex that is useful as binder in coating compositions, particularly for paper and board applications without compromising the desired properties of the coating composition comprising such a polymer latex.

SUMMARY

The problem has been surprisingly solved by a polymer latex comprising the reaction product obtained by free-radical emulsion polymerization in aqueous medium of ethylenically unsaturated monomers comprising at least one conjugated diene in presence of a degraded polysaccharide having a DE of 38 to 70 measured according to ISO 5377 (1981 Dec. 15) and optionally an alkyl mercaptan in an amount of no more than 2.5 wt.-% based on the total weight of ethylenically unsaturated monomers.

Furthermore, the present invention relates to a method for the preparation of a polymer latex wherein ethylenically unsaturated monomers comprising at least one conjugated diene are subjected to free-radical emulsion polymerization in aqueous medium in presence of a degraded polysaccharide having a DE of 38 to 70 and optionally an alkyl mercaptan in an amount of no more than 2.5 weight percent based on the total weight of ethylenically unsaturated monomers.

The present invention also relates to a coating composition comprising the polymer latex according to the present invention and the use of said polymer latex as binder in a coating composition for coating paper or board.

Thus, the present invention also relates to a method for coating paper or board comprising applying the coating composition of the present invention on a substrate selected from paper or board and to a paper or cardboard coated with the coating composition according to the present invention.

The present inventors have surprisingly found that when ethylenically unsaturated monomers comprising at least one conjugated diene are polymerized by free-radical emulsion polymerization in an aqueous medium in presence of a degraded starch having a relatively high DE of 38 to 70, chain transfer agents such as sulfur-containing compounds, for example alkyl mercaptan, can be omitted or at least reduced during the emulsion polymerization process without compromising the desired properties of coating compositions comprising such polymer latex.

DETAILED DESCRIPTION OF CERTAIN EMBODIMENTS

In the following the present invention will be described in more detail. The present invention relates to a polymer latex comprising the reaction product obtainable by free-radical emulsion polymerization in an aqueous medium of ethylenically unsaturated monomer comprising at least one conjugated diene in presence of a degraded polysaccharide having a DE of 38 to 70, measured according to ISO 5377 (1981 Dec. 15) and optionally an alkyl mercaptan in an amount of no more than 2.5 wt.-% based on the total weight of ethylenically unsaturated monomers.

According to the present invention, in the emulsion polymerization process any degraded polysaccharide having the DE requirement as above can be employed. The term "polysaccharide" encompasses polysaccharides and oligosaccharides. Suitable examples are glucose syrup, commercially available from e.g Cargill Deutschland GmbH, Krefeld, Germany or Roquette, Lestrem, France and other alternatives of degraded polysaccharides that can be used according to the present invention.

The degraded polysaccharide can be applied in the free-radical emulsion polymerization process of the present invention in broad ranges. Preferably, the degraded polysaccharide of the present invention is present in an amount of 5 to 60 wt.-%, more preferred 10 to 50 wt.-%, and most preferred 15 to 45 wt.-%, based on the total weight of ethylenically unsaturated monomers employed in the polymerization process.

Thus, the degraded polysaccharide according to the present invention can be present in amounts of at least 1 wt.-%, at least 3 wt.-%, at least 5 wt.-%, at least 7 wt.-%, at least 8 wt.-%, at least 10 wt.-%, at least 11 wt.-%, at least 12 wt.-%, at least 13 wt.-%, at least 14 wt.-%, at least 15 wt.-%, at least 16 wt.-%, at least 17 wt.-%, at least 18 wt.-%, at least 19 wt.-%, at least 20 wt.-%, at least 21 wt.-%, at least 22 wt.-%, at least 23 wt.-%, at least 24 wt.-%, at least 25 wt.-%, at least 26 wt.-%, at least 27 wt.-%, at least 28 wt.-%, at least 29 wt.-%, at least 30 wt.-%, at least 31 wt.-%, at least 32 wt.-%, at least 33 wt.-%, at least 34 wt.-%, or at least 35 wt.-%, based on the total weight of ethylenically unsaturated monomers.

Likewise, the degraded polysaccharide according to the present invention can be used in amounts of no more than 70 wt.-%, no more than 65 wt.-%, no more than 60 wt.-%, no more than 55 wt.-%, no more than 53 wt.-%, no more than 51 wt.-%, no more than 50 wt.-%, no more than 49 wt.-%, no more than 48 wt.-%, no more than 47 wt.-%, no more than 46 wt.-%, no more than 45 wt.-%, no more than 44 wt.-%, no more than 43 wt.-%, no more than 42 wt.-%, no more than 41 wt.-%, no more than 40 wt.-%, no more than 39 wt.-%, no more than 38 wt.-%, no more than 37 wt.-%, or no more than 36 wt.-%.

A person skilled in the art will understand that any range formed by any of the explicitly disclosed lower limits and upper limits is explicitly encompassed in the present specification.

The degraded polysaccharide according to the present invention can have a DE within the above specified range. Preferably the DE is from 42 to 65, more preferred from 42 to 60. Thus, the DE of the degraded polysaccharide can be at least 42, at least 43, at least 44, at least 45, at least 46, at least 47, at least 48, at least 49, at least 50, at least 51, at least 52, at least 53, at least 54, or at least 55.

Likewise, the DE of the degraded polysaccharide can be less than 68, less than 66, less than 65, less than 64, less than 63, less than 62, less than 61, less than 60, less than 59, or less than 58.

A person skilled in the art will appreciate that any subrange formed by an explicitly disclosed lower limit and an explicitly disclosed upper limit is encompassed by the description of the present invention.

The ethylenically unsaturated monomers to be polymerized in the free-radical emulsion polymerization according to the present invention comprise:
a) 19.9 to 80 wt.-%, preferably 20 to 70 wt.-%, more preferred 25 to 50 wt.-% of conjugated dienes;
b) 0 to 80 wt.-%, preferably 25 to 75 wt.-%, more preferred 30 to 70 wt.-% of vinyl aromatic compounds;
c) 0.1 to 10 wt.-%, preferably 1 to 10 wt.-% of ethylenically unsaturated acids;
d) 0 to 80 wt.-%, preferably 0.5 to 75 wt.-%, more preferred 1 to 50 wt.-% of ethylenically unsaturated monomers different from the monomers a) to c), the weight percentage being based on the total weight of the ethylenically unsaturated monomers, whereby monomers a) to d) are each different.

Conjugated diene monomers suitable for the preparation of the latices according to the present invention include conjugated diene monomers, selected from 1,3-butadiene, isopropene and 2,3-dimethyl-1,3-butadiene. 1,3-butadiene is the preferred conjugated diene according to the present invention. Typically the amount of conjugated diene monomer ranges from 19.9 to 80 wt.-%, preferably from 20 to 70 wt.-%, more preferred from 20 to 65 wt.-%, more preferred from 20 to 55 wt.-%, and even more preferred from 25 to 50 wt.-%, and most preferred from 30 to 45 wt.-%, based on the total weight of monomers. Thus, the conjugated diene may be present in amounts of at least 20 wt.-%, at least 22, wt.-%, at least 24 wt.-%, at least 26 wt.-%, at least 28 wt.-%, or at least 30, wt.-%, based on the total weight of the ethylenically unsaturated monomers.

Accordingly, the conjugated diene monomers can be used in amounts of no more than 80 wt.-%, no more than 75 wt.-%, no more than 73 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, no more than 56 wt.-%, no more than 54 wt.-%, no more than 52 wt.-%, no more than 50 wt.-%, no more than 48 wt.-%, no more than 46 wt.-%, or no more than 44 wt.-%.

A person skilled in the art will appreciate that any range between any of the explicitly disclosed lower and upper limit is herein disclosed.

Representatives of vinyl-aromatic monomers include, for example, styrene, α-methylstyrene, p-methylstyrene, t-butylstyrene and vinyltoluene. Mixtures of one or more of the vinyl-aromatic compounds may also be used. The preferred monomers are styrene and α-methylstyrene. The vinyl-aromatic compounds can be used in a range of from 0 to 80 wt.-%, preferably from 25 to 75 wt.-%, more preferred from 30 to 70 wt.-%, and most preferred from 35 to 70 wt.-%, based on the total weight of ethylenically unsaturated monomers. Thus, the vinyl-aromatic compound can be present in an amount of at least 5 wt.-%, at least 10 wt.-%, at least 15 wt.-%, at least 20 wt.-%, at least 22 wt.-%, at least 24 wt.-%, at least 26 wt.-%, at least 28 wt.-%, at least 30 wt.-%. Likewise, the vinyl-aromatic compounds can be present in an amount of no more than 80 wt.-%, no more than 78 wt.-%, no more than 76 wt.-%, no more than 74 wt.-%, no more than 72 wt.-%, no more than 70 wt.-%, no more than 68 wt.-%, no more than 66 wt.-%, or no more than 65 wt.-%, based on the total weight of ethylenically unsaturated monomers. A person skilled in the art will appreciate that any range between one of the explicitly disclosed lower limits and upper limits is disclosed herein.

The ethylenically unsaturated carboxylic acid monomers suitable for use in the present invention include monocarboxylic acid and dicarboxylic acid monomers and monoesters of dicarboxylic acid. Carrying out the present invention it is preferable to use ethylenically unsaturated aliphatic mono- or dicarboxylic acids or anhydrides which contain from 3 to 5 carbon atoms. Examples of monocarboxylic acid monomers include an acrylic acid, methacrylic acid, crotonic acid and examples of dicarboxylic acid monomers include fumaric acid, itaconic acid, maleic acid and maleic anhydride. Examples of other suitable ethylenically unsaturated acids include vinyl acetic acid, vinyl lactic acid, vinyl sulfonic acid, 2-Methyl-2-propene-1-sulfonic acid, styrene sulfonic acid, acrylamidomethyl propane sulfonic acid and the salts thereof The use of ethylenically unsaturated acid monomers influences the properties of the polymer dispersion and of the coating produced thereof. The type and the amount of these monomers are determined thereby. Typically, such an amount is from 0.1 to 10 wt.-%, preferably from 1 to 10 wt.-%, based on the total weight of the ethylenically unsaturated monomers. Thus, the ethylenically unsaturated acid monomers may be present in amounts of at least 0.1 wt.-%, at least 0.3 wt.-%, at least 0.5 wt.-%, at least 0.7 wt.-%, at least 0.9 wt.-%, at least 1 wt.-%, at least 1.2 wt.-%, at least 1.4 wt.-%, at least 1.6 wt.-%, at least 1.8 wt.-%, at least 2 wt.-%. Likewise, the ethylenically unsaturated acid monomers may be present in amounts of no more than 10 wt.-%, no more than 9.5 wt.-%, no more than 9 wt.-%, no more than 8.5 wt.-%, no more than 8 wt.-%, no more than 7.5 wt.-%, no more than 7 wt.-%, no more than 6.5 wt.-%, or no more than 6 wt.-%, based on the total weight of ethylenically unsaturated monomers. A person skilled in the art will appreciate that any range defined by an explicitly disclosed lower limit and an explicitly disclosed upper limit is disclosed herewith.

Optionally, the ethylenically unsaturated monomer used in the free-radical emulsion polymerization to form the polymer latex according to the present invention may include additional ethylenically unsaturated monomers that are different from the above-defined monomers a) to c). These monomers may be selected from esters of (meth)acrylic acid, vinyl esters, unsaturated nitriles and amides of ethylenically unsaturated acids.

Nitrile monomers which can be used in the present invention include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile and fumaronitrile, with acrylonitrile being most preferred. These nitrile monomers can be included in amounts of up to 25 wt.-%, preferably from 0.5 to 15 wt.-%, and more preferred from 1 to 12 wt.-%, based on the total weight of ethylenically unsaturated monomers.

Vinyl ester monomers which can be used according to the present invention include vinyl acetate, vinyl proprionate, vinyl butyrate, vinyl benzoate, vinyl-2-ethylhexanoate, vinyl stearate, and the vinyl esters of versatic acid. The most preferred vinyl ester monomers for use in the present invention is vinyl acetate. Typically, the amount of vinyl ester monomers that may be present in the emulsion polymerization for making the polymer latex according to the present invention ranges from 0 to 45 wt.-%, preferably from 0 to 35 wt.-%, based on the total weight of ethylenically unsaturated monomers.

Esters of (meth)acrylic acid that can be used according to the present invention include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pyvalic acid and hydroxyalkyl (meth)acrylate and alkoxyalkyl (meth)acrylate monomers.

In general, the preferred alkyl esters of (meth)acrylic acids may be selected from $C_1$-$C_{10}$ alkyl (meth)acrylate, preferably $C_1$-$C_{10}$-alkyl (meth)acrylates. Examples of such acrylate monomers include n-butyl acrylate, secondary butyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. Typically, the amount of alkyl (meth)acrylate monomers which are present in the polymeric phase depends on the monomer chosen, but is typically in the range of 0 to 70 wt.-%, preferably from 0 to 60 wt.-%, and most preferred from 0 to 50 wt.-%, based on the total amount of ethylenically unsaturated monomers.

The hydroxy alkyl(meth)acrylate monomers which can be used to prepare the polymer latex according to the present invention include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Typically, the amount of hydroxy alkyl (meth)acrylate monomer present in the polymeric phase depends on the monomer chosen, but the typical range is from 0 to 15 wt.-%, preferably from 0 to 10 wt.-%, based on the total weight of ethylenically unsaturated monomers.

Alkoxyalkyl (meth)acrylate monomers which can be used in the present invention include methoxyethyl methacrylate, ethoxyethyl methacrylate, methoxyethyl methacrylate, ethoxyethyl acrylate, butoxyethyl methacrylate, methoxybutyl acrylate and methoxyethoxyethyl acrylate. Preferred alkoxyalkyl(meth)acrylate monomers are ethoxyethyl acrylate and methoxyethyl acrylate. Typically, the amount of alkoxyethyl alkyl (meth)acrylate monomers which is present in the polymeric phase depends on the monomer chosen, but the typical range is from 0 to 65 wt.-%, preferably from 0 to 45 wt.-%, based on the total weight of ethylenically unsaturated monomers.

Amides of ethylenically unsaturated acids that can be used for the preparation of the polymer latex according to the present invention include acrylamide, methacrylamide, and diacetone acrylamide. The preferred amide monomer is acrylamide. Typically, the amount of amides of ethylenically unsaturated acid is in the range of from 0 to 10 wt.-%, preferably from 0 to 5 wt.-%, most preferred from 0 to 2 wt.-%, based on the total weight of ethylenically unsaturated monomers.

In one embodiment the polymer latex according to the present invention is prepared from ethylenically unsaturated monomers comprising styrene, 1,3-butadiene and acrylic acid.

In another embodiment the polymer latex according to the present invention is made from ethylenically unsaturated monomers comprising styrene, butadiene, acrylonitrile and acrylic acid.

For both embodiments the specific amounts of the monomers as given above for the monomer groups a) to d) can be selected.

It is an important aspect of the present invention that by using degraded polysaccharides having a DE of 38 to 70, chain transfer agents can be considerably reduced or even omitted during emulsion polymerization of the ethylenically unsaturated monomers according to the present invention without compromising the product properties conferred to coating compositions by the polymer latex according to the present invention. Thus, the amount of chain transfer agent present during the emulsion polymerization can be less than 2.4 wt.-%, less than 2.2 wt.-%, less than 2 wt.-%, less than 1.8 wt.-%, less than 1.6 wt.-%, less than 1.4 wt.-%, less than 1.2 wt.-%, less than 1.0 wt.-%, less than 0.9 wt.-%, less than 0.8 wt.-%, less than 0.7 wt.-%, less than 0.6 wt.-%, less than 0.5 wt.-%, less than 0.4 wt.-%, less than 0.3 wt.-%, less than 0.2 wt.-%, or less than 0.1 wt.-%. Of course, the amount of chain transfer agent that is still necessary in order to maintain the performance properties of the coating composition comprising polymer latex of the present invention will depend on the type of degraded starch used and their amount as well as on the selection and relevant amount of the ethylenically unsaturated monomers. Thus, a person skilled in the art will appreciate that by appropriate selections of this parameter a chain transfer agent might even be totally omitted in the preparation of the polymer latex according to the present invention.

Accordingly, the compositions objected to free-radical emulsion polymerization for producing the polymer latex according to the present invention can comprise less than 2.5 wt.-%, less than 2 wt.-%, less than 1.8 wt.-%, less than 1.6 wt.-%, less than 1.4 wt.-%, less than 1.2 wt.-%, less than 1 wt.-%, less than 0.9 wt.-%, less than 0.8 wt.-%, less than 0.7 wt.-%, less than 0.6 wt.-%, less than 0.5 wt.-%, less than 0.4 wt.-%, less than 0.3 wt.-%, less than 0.2 wt.-%, or less than 0.1 wt.-%, based on the total weight of ethylenically unsaturated monomers of mercapto compounds that are usually employed as chain transfer agents according to the teaching of the prior art. As will be appreciated by the person skilled in the art taking into account the above-disclosed considerations with respect to the selection of parameters in order to reduce the necessary amount of chain transfer agent mercapto compounds can also be totally omitted. As a consequence, the polymer latex of the present invention can be considered as a low odor polymer latex.

In general, the polymer latex composition of the present invention can be prepared by polymerization processes which are known in the technical area, and in particular by the known latex emulsion polymerization processes, including a latex polymerization carried out with seeds (seed latex) and a latex polymerization not carried out with seed latex. Representative processes include those which are described in U.S. Pat. No. 4,478,974; U.S. Pat. No. 4,751,111; U.S. Pat. No. 4,968,740; U.S. Pat. No. 3,563,946; U.S. Pat. No. 3,575,913; and DE-A-19 05 256. Such processes can be adapted for the polymerization of the monomers described above. The method for introducing the monomers and other ingredients, such as polymerization assistants, is not particularly critical. The polymerization is then carried out under conventional conditions until the desired conversion of monomer in to polymer has been reached. Crosslinking agents and the well known adjuvants for latex polymerization, such as initiators, surfactants, bases, buffers and emulsifiers, can be used depending on requirements.

The process for the preparation of the above-described polymer latex can be performed at temperatures of from 0 to 130° C., preferably of from 60 to 130° C., particularly preferably of from 60 to 100° C., very particularly preferably of from 75 to 100° C., in the presence of no or one or more emulsifiers and one or more initiators, such as, for example, preferably sodium persulfate or ammonium persulfate. The temperature includes all values and subvalues there between, especially including 5, 10, 15, 20, 25, 30, 35, 40, 45, 50, 55, 60, 65, 70, 75, 80, 85, 90, 95, 100, 105, 110, 115, 120 and 125° C.

Initiators which can be used when carrying out the present invention include water-soluble and/or oil-soluble initiators which are effective for the purposes of the polymerization. Representative initiators are well known in the technical area and include, for example: azo compounds (such as, for example, AIBN, AMBN and cyanovaleric acid) and persulfates (such as, for example, potassium persulfate, sodium persulfate and ammonium persulfate).

The initiator is used in a sufficient amount to initiate the polymerization reaction at a desired rate. In general, an amount of initiator of from 0.05 to 5, preferably of from 0.1 to 4%, by weight, based on the weight of the total polymer, is sufficient. The amount of initiator is most preferably of from 0.1 to 3% by weight, based on the total weight of the polymer. The amount of initiator includes all values and subvalues there between, especially including 0.1, 0.5, 1, 1.5, 2, 2.5, 3, 3.5, 4 and 4.5% by weight, based on the total weight of the polymer.

Surfactants or emulsifiers which are suitable for stabilizing the latex particles include those conventional surface-active agents for polymerization processes. The surfactant or surfactants can be added to the aqueous phase and/or the monomer phase. An effective amount of surfactant in a seed process is the amount which was chosen for supporting the stabilization of the particle as a colloid, the minimization of contact between the particles and the prevention of coagulation. In a non-seeded process, an effective amount of surfactant is the amount which was chosen for influencing the particle size.

Representative surfactants include saturated and ethylenically unsaturated sulfonic acids or salts thereof, including, for example, unsaturated hydrocarbonsulfonic acid, such as vinylsulfonic acid, allylsulfonic acid and methallylsulfonic acid, and salts thereof; aromatic hydrocarbon acids, such as, for example, p-styrenesulfonic acid, isopropenylbenzenesulfonic acid and vinyloxybenzenesulfonic acid and salts thereof; sulfoalkyl esters of acrylic acid and methacrylic acid, such as, for example, sulfoethyl methacrylate and sulfopropyl methacrylate and salts thereof, and 2-acrylamido-2-methylpropanesulfonic acid and salts thereof; alkylated diphenyl oxide disulfonates, sodium dodecylbenzenesulfonates and dihexyl esters of sodium sulfosuccinate, ethoxylated alkylphenols and ethoxylated alcohols; fatty alcohol (poly)ethersulfates.

The type and the amount of the surfactant is governed typically by the number of particles, their size and their composition. Typically, the surfactant is used in amounts of from 0 to 20, preferably from 0 to 10, more preferably from 0 to 5, parts by weight, based on the total weight of the monomers. The amount of surfactant includes all values and subvalues therebetween, especially including 0, 0.1, 0.5, 1, 2, 3, 4, 5, 6, 7, 8, 9, 10, 11, 12, 13, 14, 15, 16, 17, 18 and 19 parts by weight based on the total weight of the monomer. According to one embodiment of the present invention the polymerization is conducted without using surfactants.

Furthermore it can be beneficial to introduce partial neutralization to the polymerization process to regulate the ongoing degradation of the polysaccharide. A person skilled in the art will appreciate that by appropriate selections of this parameter the necessary control can be achieved.

Various protective colloids can also be used instead of or in addition to the surfactants described above. Suitable colloids include polyhydroxy compounds, such as partially acetylated polyvinyl alcohol, casein, hydroxyethyl starch, carboxymethylcellulose, hydroxyethylcellulose, hydroxypropylcellulose, polyethylene glycol and gum arabic. The preferred protective colloids are carboxymethylcellulose, hydroxyethylcellulose and hydroxypropylcellulose. In general, these protective colloids are used in contents of from 0 to 10, preferably from 0 to 5, more preferably from 0 to 2, parts by weight, based on the total weight of the monomers. The amount of protective colloids includes all values and subvalues therebetween, especially including 1, 2, 3, 4, 5, 6, 7, 8 and 9 parts by weight, based on the total weight of the monomers.

Various other additives and ingredients can be added in order to prepare the latex composition of the present invention. Such additives include, for example: antifoams, wetting agents, thickeners, plasticizers, fillers, pigments, dispersants, optical brighteners, crosslinking agents, antioxidants and metal chelating agents. Known antifoams include silicone oils and acetylene glycols. Customary known wetting agents include alkylphenol ethoxylates, alkali metal dialkylsulfosuccinates, acetylene glycols and alkali metal alkylsulfate. Typical thickeners include polyacrylates, polyacrylamides, xanthan gums, modified celluloses or particulate thickeners, such as silicas and clays. Typical plasticizers include mineral oil, liquid polybutenes, liquid polyacrylates and lanolin. Zinc oxide, titanium dioxide, aluminum hydroxide, calcium carbonate and clay are the fillers typically used.

Having generally described this invention, a further understanding can be obtained by reference to certain specific examples which are provided herein for purposes of illustration only, and are not intended to be limiting unless otherwise specified.

Examples

Following test methods were used to determine the properties of the degraded polysaccharide starting material, the properties of the polymer latex of the present invention and of a paper coating composition of the present invention.
DE:
 The dextrose equivalent of the degraded starch was measured according to ISO 5377 (1981 Dec. 15)
Gel Content:
Apparatus
 1. Petri dish
 2. Boiling flask
 3. Reflux condenser
 4. Filtering funnel
 5. Filtering wire
 6. Microwave oven
 7. Analytical balance
 8. Electric bath
 9. Stirrer
Reagents: Toluene p.a.
Procedure: Take around 10 ml of a latex dispersion and spread it evenly into ø 100 mm Petri dish. Dry Petri dishes by putting dishes into microwave oven and heat 8 min at 800 W power (this sample is for a double determination).
Latex film: Remove latex film from warmed Petri dish and cut it to strips. Weigh about 1 g (by accuracy of 0,001 g) film strips. Put into 500 ml boiling flask. Add 100 ml toluene and connect a reflux condenser to flask. Boil 1 hour on electric bath. After 1 hour remove flask from electric bath and cool to room temperature.
Residue: Filter residue in boiling flask by means of burned and weighed 50 µm mesh steel wire in filtering funnel. Dry residue on steel wire in heating chamber, 2 hours at temperature 120° C. Cool to ambient temperature and weigh.

$$\text{Calculation: Gel content } \% = \frac{c-b}{a} * 100$$

a=mass of latex strips
b=mass of clean filtering wire
c=mass of dry filtering wire+residue
Wet Pick Resistance:
 Determination of wet pick resistance is carried out on the universal test printing device from Prüfbau. Coated paper samples to be tested are cut in the longitudinal direction with a size of 240×46 mm. Paper strips are printed with inks commercially available under the trade name "Lorillieux, L3800-L3808" (increasing tack force). A starting amount of 300 mg is applied to an ink distribution roll. A steel printing disk is inked for 30 s. A coated paper strip is mounted on a rubber-backed supporter. Fountain solution (16 µl; 20% isopropanol) is applied to the middle area of the paper strip. This is followed by printing with the inked steel disk at a speed of 0.5 m/s and a printing pressure of 800 N. The steel printing disk is then printed for a second time on a reverse printing paper. A higher color density in the middle area means ink refusal. White spots in the middle area are an indication for wet picking. This procedure is repeated with the inks in increasing order (higher color code meaning higher tack force) till a clear picture of wet picking is visible. The color code noted is a measure for the wet pick resistance of the coated paper. Higher numbers show better wet pick resistance.

Offset Printability:

Determination of offset printability is carried out on the universal test printing device from Prüfbau. Coated paper samples to be tested are cut in the longitudinal direction with a size of 240×46 mm. Paper strips are printed with an ink commercially available under the trade name "Huber Wegschlagfarbe No. 520068". A starting amount of 300 mg is applied to an ink distribution roll. A steel printing disk is inked for 30 s. A coated paper strip is mounted on a rubber-backed supporter and printed with the inked steel disk at a speed of 0.5 m/s and a printing pressure of 800 N. After a delay time of 10 s, the paper strip is re-printed using the ink containing steel printing disk (with a printing pressure of 800 N). This procedure is repeated until picking is noticed at the surface of the coated paper strip. The number of printing passes required to cause picking at the coated paper surface is a measure for the surface strength of the paper.

Examples and Comparative Examples

Preparation of the Polymer Latex

Preparation of the Initial Solution:
To 981.72 g of demineralised water 469.88 grams of a preheated glucose syrup obtained from Cargill Deutschland GmbH, Krefeld, Germany having a DE as indicated in table 1 (solids content ca 83%) are added under stirring. After the glucose syrup has dissolved completely 0.13 g EDTA and 62.9 g seed latex (Particle size ca 20-40 nm, solids content ca 31%) are added under stirring to form an initial solution.

Preparation of the Feeds:
Initiator solution: 18.85 g of sodiumperoxodisulfate are dissolved in 357.65 g of demineralised water.
Feed 1: 468 g of butadiene
Feed 2: 773.5 g styrene, t-dodecylmercaptan (t-DDM) in amounts expressed as weight percent based on total weight of monomers as given in Table 1
Feed 3: 292.5 g acrylic acid (13.3% aqueous solution)
Feed 4: sodiumperoxodisulfate (76% of total initiator solution).
Feed 5: sodiumperoxodisulfate (14% of total initiator solution).

The initial solution is charged into a pressure reactor and heated to 85° C. under stirring. When the reaction temperature of 85° C. is reached, the initiator feed starts and 10% of the total initiator solution is fed to the reactor within 10 minutes. Subsequently to the initiator feed Feed 1, 2, 3 and 4 are started and are finished 4 hours later. After the Feeds 1-4 have ended, Feed 5 is started for 1 hour.

The reactor is held at 85° C. for 2 hours and cooled down to room temperature under stirring. To the latex ca 80 ml of a 10% sodium hydroxide solution is added to adjust the latex to a pH of ca 6. The latex is degassed to remove residual monomers.

The product is a highly stable, white latex at a solids content of ca 50% with extremely low viscosity.

The gel content of the latex was measured as described above and is reported in Table 1.

Paper coating compositions were prepared using the polymer latex according to the examples and comparative examples. In an appropriate stirring unit 70 parts by weight of calcium carbonate (Hydrocarb 90 ME, Omya International AG, Oftringen Switzerland) and 30 parts by weight of clay (Capim NP, Imerys Mineraux Belgique SA, Lixhe, Belgium) are pre-dispersed to form a slurry. To the slurry 12 parts by weight of latex and 0.3 parts by weight of CMC (Finnix 30, CP Kelco BV, Nijmegen, The Netherlands) are added. Finally aqueous sodium hydroxide is added to adjust the pH to 8.5 and water is added to give a total solids content of 69%. The viscosity of the coating composition was within the range of 1200 to 1500 mPas (Brookfield RVT, spindle 4, 100 rpm measured at 23° C.)

In order to prepare test specimens of coated paper the coating compositions described above are applied to the Synthomer lab coater and coated on uncoated wood-free base paper having a weight of 80 g/m$^2$ at a dry coating weight (ca. 5% residual moisture) of 12 g/m$^2$. The paper was calendered using following conditions: 90° C., 30 m/min, 220 kN/m line pressure. The obtained paper was tested for wet pick resistance and offset printability as described above. The data is reported in Table 1.

TABLE 1

| Example | DE | wt.-% T-DDM | Gel Content (%) | Wet pick | Offset |
|---|---|---|---|---|---|
| Comp. 1 | 29 | 1.5 | 74 | 5 | 7 |
| Comp. 2 | 29 | 0.9 | 83 | n.d. | n.d. |
| Comp. 3 | 29 | 0.5 | 93 | 4 | 5 |
| Ex. 1 | 40 | 1.2 | 65 | 5 | 7 |
| Ex. 2 | 40 | 0.9 | 76 | 5 | 7 |
| Ex. 3 | 40 | 0.5 | 87 | 5 | 8 |
| Ex. 4 | 60 | 0.9 | 76 | n.d. | n.d. |
| Ex. 5 | 60 | 0.5 | 85 | 5 | 6 |
| Ex. 6 | 60 | 0.2 | 92 | 4 | 6 |

As is evident from the experimental data shown in Table 1, the gel content of the polymer latex increases at a given DE of the degraded polysaccharide with decreasing concentration of chain transfer agent, as a person skilled in the art would expect since then the molecular weight cannot effectively be controlled any longer with a reduced amount of chain transfer agents. Surprisingly, it has been found that if the DE of the degraded polysaccharide is within the claimed range, the gel content can be much better controlled even at a lower concentration of chain transfer agent. Thus, the experimental data clearly confirm that the amount of chain transfer agents, particularly alkyl mercaptans, can be reduced while still maintaining a lower or at least the same gel content compared to the comparative examples having a degraded polysaccharide with a DE outside the claimed range.

Selecting the degraded polysaccharide within the claimed DE range shows similar effects with respect to offset and wet pick. As can be seen when comparing comparative example 1 with example 1 and 2, the same properties of offset and wet pick can be achieved with a considerably reduced concentration of chain transfer agent, particularly alkyl mercaptan. When looking at a comparison between comparative example 3 and examples 3 and 5, all using the same level of chain transfer agent, the presence of a degraded polysaccharide within the claimed range leads to an improvement in offset and wet pick, compared to the polymer latex prepared with a degraded polysaccharide having a DE of 29. A maximum improvement can be seen for example 3. And example 6, even at a very low level of chain transfer agent, shows at least an improvement with respect to offset test performance compared to comparative example 3.

Thus, it has also been confirmed by the experimental data that important properties of coating compositions can be maintained if the polymer latex used as binder in such coating composition is produced with a degraded polysaccharide having a DE within the claimed range while reducing the amount of chain transfer agents, particularly alkyl mercaptans. This effect of degraded polysaccharides having a DE within the range of 38 to 70 was not derivable from the prior art.

What is claimed is:

1. A polymer latex comprising the reaction product obtained by free-radical emulsion polymerization in aqueous medium of ethylenically unsaturated monomers comprising at least one conjugated diene in presence of a degraded polysaccharide having a dextrose equivalent (DE) of 42 to 70 measured according to ISO 5377 (1981 Dec. 15),
    wherein the free-radical emulsion polymerization is conducted in the presence of a chain transfer agent in an amount of no more than 2.5 weight percent based on the total weight of the ethylenically unsaturated monomers,
    wherein the chain transfer agent is a mercapto compound,
    wherein the ethylenically unsaturated monomers comprise:
    a) 19.9 to 80 weight percent of a conjugated diene;
    b) 25 to 75 weight percent of a vinyl aromatic compound;
    c) 0.1 to 10 weight percent of an ethylenically unsaturated acid; and
    d) 0 to 80 weight percent of an ethylenically unsaturated monomer different from the monomers a) to c),
    wherein the weight percentage of the monomers a) to d) are based on the total weight of the ethylenically unsaturated monomers, wherein the monomers a) to d) are different from each other.

2. The polymer latex according to claim 1, wherein the conjugated diene is at least one selected from the group consisting of 1,3-butadiene, 2,3-dimethyl-1,3-butadiene and isoprene.

3. The polymer latex according to claim 1, wherein the vinyl aromatic compound is at least one selected from the group consisting of styrene, α-methyl styrene, p-methylstyrene, t-butylstyrene, and vinyltoluene; the ethylenically unsaturated acid is at least one selected from the group consisting of methacrylic acid, itaconic acid, maleic acid, fumaric acid, crotonic acid, vinyl acetic acid, vinyl lactic acid, vinyl sulfonic acid, styrene sulfonic acid, and acrylamidomethyl propane sulfonic acid; and the ethylenically unsaturated monomer different from the monomers a) to c) is at least one selected from the group consisting of ester of methacrylic acid, vinyl ester, unsaturated nitrile, and amide of ethylenically unsaturated acid.

4. The polymer latex according to claim 1, wherein the degraded polysaccharide has a dextrose equivalent (DE) of 40 to 65.

5. The polymer latex according to claim 1, wherein the degraded polysaccharide is present in an amount of 5 to 60 weight percent based on the total weight of the ethylenically unsaturated monomers.

6. A method for the preparation of the polymer latex according to claim 1, the method comprising:
    conducting the free radical emulsion polymerization of the ethylenically unsaturated monomers comprising said at least one conjugated diene in the aqueous medium in the presence of the degraded polysaccharide having the DE of 38 to 70 and the chain transfer agent in the amount of no more than 2.5 weight percent based on the total weight of ethylenically unsaturated monomers,
    wherein the chain transfer agent is an alkyl mercaptan.

7. A coating composition, comprising the polymer latex according to claim 1.

8. A method for coating a paper or a paper board, comprising:
    applying the coating composition according to claim 7 onto a substrate selected from the group consisting of a paper and a board.

9. A substrate selected from the group consisting of a paper and a board, which is coated with the coating composition according to claim 7.

10. The polymer latex according to claim 1, wherein the mercapto compound is an alkyl mercaptan.

11. A polymer latex comprising the reaction product obtained by free-radical emulsion polymerization in aqueous medium of ethylenically unsaturated monomers comprising at least one conjugated diene in presence of a degraded polysaccharide having a dextrose equivalent (DE) of 38 to 70 measured according to ISO 5377 (1981 Dec. 15), wherein the ethylenically unsaturated monomers comprise:
    a) 25 to 50 weight percent of the conjugated diene;
    b) 30 to 70 weight percent of the vinyl aromatic compound;
    c) 1 to 10 weight percent of the ethylenically unsaturated acid;
    d) 1 to 50 weight percent of the ethylenically unsaturated monomer different from the monomers a) to c),
    the weight percentage of the monomers a) to d) are based on the total weight of the ethylenically unsaturated monomers, wherein the monomers a) to d) are different from each other.

12. The polymer latex according to claim 10, wherein the alkyl mercaptan is not present in the free-radical emulsion polymerization.

13. The method according to claim 6, wherein the free-radical emulsion polymerization is conducted in the presence of the chain transfer agent in an amount of no more than 1 weight percent based on the total weight of the ethylenically unsaturated monomers.

14. The method according to claim 6, wherein the alkyl mercaptan is present in an amount of no more than 0.5 weight percent based on the total weight of the ethylenically unsaturated monomers.

15. A method for the preparation of a polymer latex comprising the reaction product obtained by free-radical emulsion polymerization in aqueous medium of ethylenically unsaturated monomers comprising at least one conjugated diene in presence of a degraded polysaccharide having a dextrose equivalent (DE) of 42 to 60, measured according to ISO 5377 (1981 Dec. 15), the method comprising:
    conducting the free radical emulsion polymerization of the ethylenically unsaturated monomers comprising said at least one conjugated diene in the aqueous medium in the presence of the degraded polysaccharide having the DE of 42 to 60 and a chain transfer agent in the amount of no more than 2.5 weight percent based on total weight of the ethylenically unsaturated monomers.

* * * * *

UNITED STATES PATENT AND TRADEMARK OFFICE
CERTIFICATE OF CORRECTION

PATENT NO. : 9,957,404 B2
APPLICATION NO. : 14/897199
DATED : May 1, 2018
INVENTOR(S) : Claudia Eigen et al.

Page 1 of 1

It is certified that error appears in the above-identified patent and that said Letters Patent is hereby corrected as shown below:

In the Specification

In Column 5, at Line 61, Change "thereof" to --thereof.--.

In Column 6, at Line 37, Change "proprionate," to --propionate,--.

In Column 6, at Line 52, Change "pyvalic" to --pivalic--.

Signed and Sealed this
Twenty-first Day of April, 2020

Andrei Iancu
*Director of the United States Patent and Trademark Office*